(12) United States Patent
Dircksen et al.

(10) Patent No.: US 7,310,148 B2
(45) Date of Patent: Dec. 18, 2007

(54) AUTOMATIC MATERIAL MEASUREMENT SYSTEM

(75) Inventors: Steven T. Dircksen, Minster, OH (US); Thomas J. Wente, New Bremen, OH (US)

(73) Assignee: Precision Strip, Inc., Minster, OH (US)

( * ) Notice: Subject to any disclaimer, the term of this patent is extended or adjusted under 35 U.S.C. 154(b) by 171 days.

(21) Appl. No.: 11/355,687

(22) Filed: Feb. 16, 2006

(65) Prior Publication Data

US 2007/0188770 A1  Aug. 16, 2007

(51) Int. Cl.
*G01N 21/84* (2006.01)
(52) U.S. Cl. ........................... 356/429; 356/630
(58) Field of Classification Search ........ 356/630–632, 356/614–623, 430–432, 429–431, 635; 250/559.27–559.29, 559.19, 559.24
See application file for complete search history.

(56) References Cited

U.S. PATENT DOCUMENTS

| | | | |
|---|---|---|---|
| 3,663,108 A | 5/1972 | Yamamuro et al. | |
| 3,671,726 A | 6/1972 | Kerr | |
| 3,802,774 A | 4/1974 | Eschler et al. | |
| 4,276,480 A | 6/1981 | Watson | |
| 4,743,902 A | 5/1988 | Andermo | |
| 5,210,593 A | 5/1993 | Kramer | |
| 5,253,039 A | 10/1993 | Fujimoto et al. | |
| 5,581,353 A | 12/1996 | Taylor | |
| 5,647,588 A * | 7/1997 | Stauber et al. | 271/259 |
| 5,696,589 A | 12/1997 | Bernacki | |
| 6,100,986 A | 8/2000 | Rydningen | |
| 6,281,679 B1 | 8/2001 | King et al. | |
| 6,441,905 B1 | 8/2002 | Tojyo et al. | |
| 6,459,494 B1 | 10/2002 | Kurokawa et al. | |
| 6,836,331 B2 | 12/2004 | Reis et al. | |
| 2003/0011789 A1 | 1/2003 | Shirley | |

* cited by examiner

*Primary Examiner*—Gregory J. Toatley, Jr.
*Assistant Examiner*—Tri Ton
(74) *Attorney, Agent, or Firm*—Wood, Herron & Evans, LLP (57) ABSTRACT

A system is provided for measuring at least a thickness of a strip of material extending between two oppositely facing surfaces comprising a frame having an opening for receiving the material and a transport device coupled to the frame and movable transverse to the material. First and second distance-measuring sensors are coupled to the device for synchronous movement across the frame transverse to the material, each positioned proximate one of the surfaces of the material when it is within the frame opening. The system further includes a gauge block having two oppositely facing surfaces and a known thickness therebetween. The gauge block is coupled to the device for movement with the sensors across the frame and is movable between a measuring position wherein the gauge block is positioned between the sensors and a stowed position wherein the gauge block is positioned out from between the sensors.

18 Claims, 8 Drawing Sheets

AUTOMATIC MATERIAL MEASUREMENT SYSTEM

FIELD OF THE INVENTION

The present invention relates generally to systems for measuring linear dimensions of material, especially to systems used to measure the thickness and width of sheet stock.

BACKGROUND

A wide variety of end products are manufactured from metal sheet stock, such as aluminum or stainless steel sheet stock. For example, beverage cans and various automotive parts such as radiator components and mufflers represent such products. Typically, a rolling mill produces relatively large diameter rolls of sheet stock that can vary in thickness and width. An individual strip of sheet stock can be hundreds or even thousands of feet long. The rolls of sheet stock are shipped to a processing plant where the strip is cut to the desired width and length. This product is wound into rolls which are shipped to another processing plant where the material is formed into the shape of the particular end product.

The rolls of sheet stock received from the rolling mill are placed on mandrels for processing. If it is necessary to create multiple strips of sheet stock from the initial roll, the sheet stock is typically fed to a machine containing upper and lower arbors disposed in close proximity to one another, with each arbor including rotary blades. Each rotary blade of the upper arbor is laterally spaced by a relatively small distance from the corresponding rotary blade of the lower arbor, with this lateral spacing resulting in the width of a slit between adjacent strips of material. Many strips can be cut from a single width of sheet stock and the width of a given strip can be relatively small, for instance to accommodate the ultimate manufacture of top tabs of metal cans used to contain beverages. The strip or strips of sheet stock are then processed further, including cutting the strips to the desired length.

It is necessary to very accurately measure the width of each strip and the thickness of each strip, typically at multiple locations across the width of the strip, for each roll of sheet stock. For instance, the manufacturer of an end product may require the thickness measurement of each strip of sheet stock to be accurate within plus or minus 0.0003 inch.

The necessary width and thickness measurements of the sheet metal strips can be obtained manually, with the sheet metal stationary, using a vernier caliper to obtain width measurements and a micrometer to obtain thickness measurements. As may be appreciated, this can be a time consuming process, particularly when considering the total time required throughout a day when many rolls of sheet stock are processed by a single production line, for example 50 or more rolls of sheet stock, and considering the fact that it may be necessary to measure the width of multiple strips for each roll and to measure the thickness at multiple locations for each strip. This translates into significant cost due to production line "down time" to obtain the necessary measurements.

SUMMARY

According to an embodiment of the present invention, a system is provided for measuring at least a thickness of a strip of material, with the thickness extending between two oppositely facing surfaces of the strip of material, and the strip of material further having a width. The system comprises a frame having an opening for receiving the strip of material and a transport device coupled to the frame, with the device being movable along the frame transverse to the material. First and second distance-measuring sensors are coupled to the transport device for synchronous movement across the frame transverse to the material, with each of the first and second sensors positioned proximate a respective one of the oppositely facing surfaces of the material when the material is within the opening. The system further includes a gauge block having two oppositely facing surfaces and a known thickness extending therebetween, with the gauge block coupled to the transport device for movement with the first and second sensors along the frame. The gauge block is movable between a measuring position wherein the gauge block is positioned between the first and second sensors and a stowed position wherein the gauge block is positioned out from between the first and second sensors.

In various embodiments, the system of the present invention can include one or more of the following features. The first and second sensors can be energy beam emitting sensors, for example light emitting lasers. The first and second sensors are operable for measuring the respective distances from the first and second sensors to the oppositely facing surfaces of the strip of material, when the strip of material is within the opening and the gauge block is in the stowed position, and are operable for measuring the respective distances from the first and second sensors to the oppositely facing surfaces of the gauge block when the strip of material is absent from the opening and the gauge block is in the measuring position.

The system can further include an arm pivotally coupled to the transport device and a gauge block secured to a distal end of the arm. A pair of rails can be secured to the frame, and each of the sensors are movable along one of the rails. The transport device can include upper and lower carriages, each being movable along a respective one of the rails across the width of the strip of material. The first sensor is then mounted on one of the carriages and the second sensor is mounted on the other carriage.

The system can further include a moving device coupled to the upper and lower carriages of the transport device and operable for moving the carriages and the first and second sensors synchronously along the rails across the strip of material. The moving device can comprise a motor having a rotatable output shaft and upper and lower gears coupled to the shaft for rotation therewith, with the moving device further comprising a pair of serrated belts, with each of the belts engaging one of the upper and lower gears and secured to one of the upper and lower carriages. The belts are effective for transforming rotation of the upper and lower gears into the linear movement of the upper and lower carriages and the first and second sensors along the rails.

The system can further include third and fourth sensors, each coupled to a respective one of the upper and lower carriages for movement along the rails across the width of the strip of material. The third and fourth sensors are effective for detecting the edges of the strip of material.

The system can further include an optical reader to measure a horizontal distance of the first and second sensors from either one of the edges of the strip of material. The optical reader can include a linear scale secured to the frame and extending horizontally across the frame and can further include a reader head coupled to the linear scale. The system can include a controller, with the first, second, third and fourth sensors, and the optical reader and the moving device coupled to the controller.

The system can further include a second frame spaced apart from the first frame, with the second frame also having an opening for receiving the strip of material. A clamp can be movably mounted on the second frame between retracted and extended positions, with the clamp exerting a clamp load on the strip of material when the material is within the opening of the second frame and the clamp is in the extended position.

According to another embodiment of the invention, a method is provided for measuring at least a thickness of a strip of material, with the thickness extending between two oppositely facing surfaces of the strip of material. The method comprises coupling first and second spaced sensors to a frame, for movement along the frame, with the frame defining an opening for receiving the strip of material, and positioning a gauge block between the first and second sensors, with the gauge block having two oppositely facing surfaces and a known thickness therebetween. The method further comprises moving the sensors and the gauge block along the frame across a width of the opening of the frame without the strip of material present in the opening, and also measuring a first distance between the first sensor and one of the two oppositely facing surfaces of the gauge block and measuring a second distance between the second sensor and the other of the oppositely facing surfaces of the gauge block at each of a plurality of locations along the frame across the width of the opening. Additionally, the method includes summing the first and second distances at each location and subtracting the sum from a reference value, and creating a deflection profile as a function of horizontal distance along the frame. The method also includes removing the gauge block out from between the first and second sensors; inserting the strip of material in the opening; measuring the thickness of the strip of material with the sensors at each of the plurality of locations along the frame where the thickness of the gauge block was measured; and correcting the measured values of the thickness of the strip of material with the deflection profile.

According to other embodiments of the present invention, the method can include one or more of the following: coupling the first and second sensors to first and second carriages movable along the frame transverse to the material when the material is present within the opening; and pivotally coupling an arm to one of the upper and lower carriages and securing the gauge block to a distal end of the arm, wherein the gauge block is pivotable between a stowed position wherein the gauge block is out from between the first and second sensors and a measuring position wherein the gauge block is positioned between the first and second sensors.

Additionally, the method can include coupling a third sensor to one of the upper and lower carriages and a fourth sensor to the other of the upper and lower carriages for movement with the upper and lower carriages along the frame; using the third and fourth sensors to detect the two edges of the strip of material defining a width extending between the two edges; and measuring a horizontal distance from a reference location to each of the two edges, thereby determining the width of the strip of material. The method can also include the step of using an optical reader to measure the horizontal distances along the frame from a reference location.

BRIEF DESCRIPTION OF THE DRAWINGS

The present invention will become better understood with regard to the following description, appended claims and accompanying drawings wherein:

DETAILED DESCRIPTION

Figure 1:
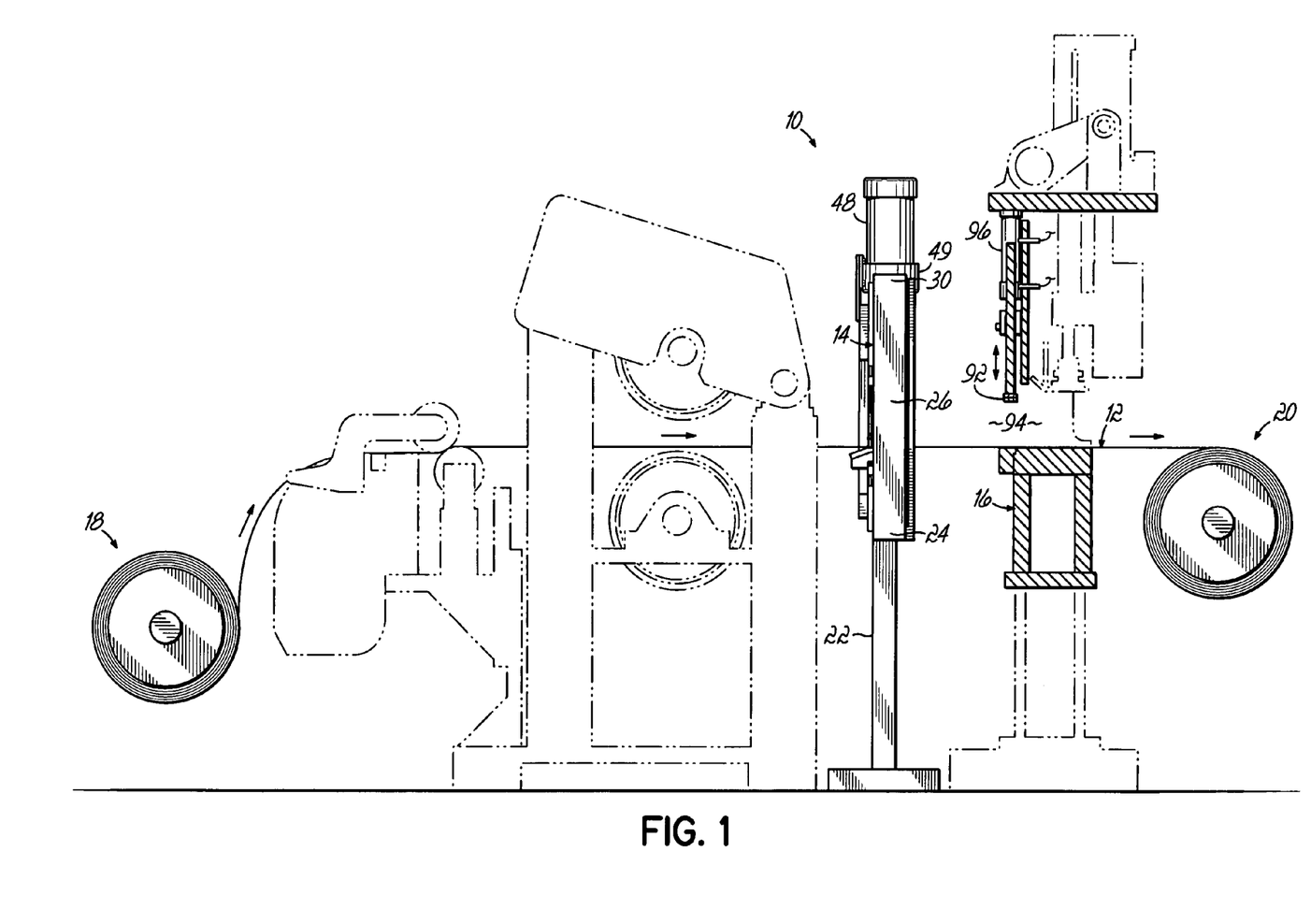
FIG. 1 is a side elevation view illustrating an automatic material measurement system according to one embodiment of the present invention.

Referring now to the drawings, FIG. 1 illustrates an automatic material measurement system 10 according to the present invention. System 10 is used to measure one or both of the thickness and width of a strip, or strips, of material 12, for example a strip of sheet metal such as aluminum or stainless steel. System 10 is not limited to measuring the width of strips of metal, but can also be used to measure the width of a strip of any other solid material and can also be used to measure the thickness of virtually any other solid material.

The strip of material 12 can be sent from a rolling mill, in the form of a roll of material such as roll 18 in FIG. 1, to an intermediate facility containing system 10 for further processing. The initial length of the strip of material 12 on roll 18 can be very large, for example hundreds or even thousands of feet long. The edges of the strip of material 12 can be trimmed prior to measurements made using system 10, to trim off rough or uneven edges as it is received from the rolling mill. Also, the strip of material 12 can be cut longitudinally to create one or more additional strips of material, and the strip of material 12 may or may not be cut to the desired length prior to taking measurements with system 10. If the strip of material 12 is cut into a plurality of strips, system 10 can be used to measure the thickness and width of each strip. Although system 10 can be used to measure a plurality of laterally spaced strips of material 12, the features and operation of system 10 will be discussed further herein with regard to a single strip of material 12.

The material is un-wound as it moves toward and through frames 14 and 16. After the material 12 is measured using system 10, the material is re-wound into a roll 20. The material 12 can then be processed further by other equipment (not shown) for cutting the strip of material 12 to the desired length and to perform other operations, such as leveling the strip of material 12 to ensure that it is sufficiently flat before the material 12 is sent to the facility making the final product. This equipment is not part of the present invention.

Figure 2:
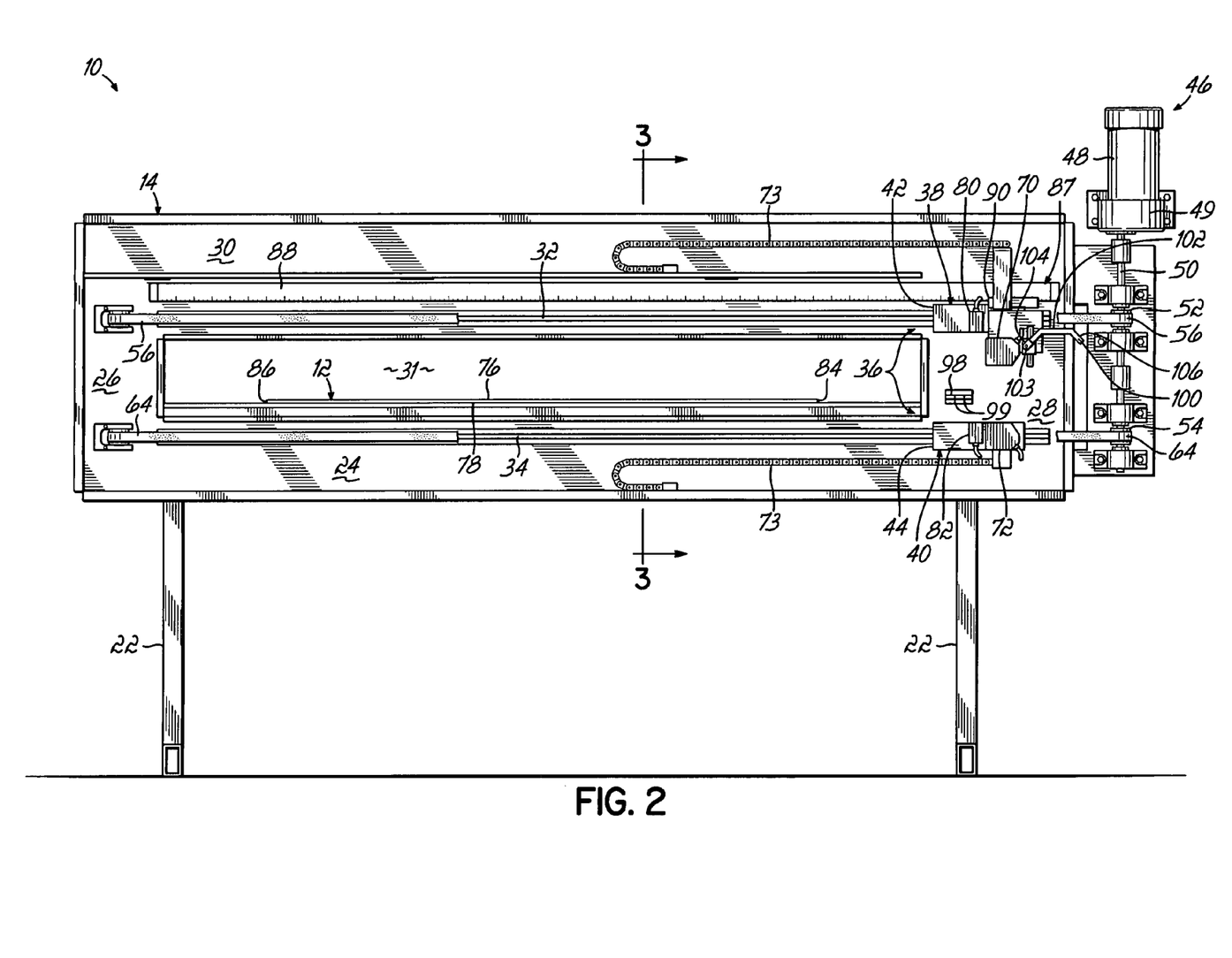
FIG. 2 is a front elevation view of the system shown in FIG. 1.

System 10 includes a frame 14 and a frame 16 spaced apart from one another, such as shown in FIG. 1, to mechanically isolate frame 14 from frame 16 for a subsequently discussed purpose. Frame 14 includes a base indicated generally at 22, that can have a variety of configurations and can be positioned on a floor or other support surface in a facility. As shown in FIG. 2, frame 14 further includes a bottom, horizontally extending member 24 supported by base 22 and first 26 and second 28 side members that extend upwardly from base 22. Frame 14 also includes a horizontally extending top member 30, with side members 26 and 28 interconnecting the top 30 and bottom 24 members. The top member 30, bottom member 24 and side members 26 and 28 of frame 14 define an opening 31 that is suitable for receiving a strip or strips of material 12 therethrough.

As shown in FIGS. 2-6, an upper rail 32 is secured to the top member 30 of frame 14 by conventional means such as fasteners, and a lower rail 34 is secured to the bottom member 24 of frame 14 by conventional means such as fasteners. Each of the rails 32, 34 include a raceway to accept roller bearings (not shown) included in bearing blocks secured to the subsequently discussed carriages.

Figure 3:
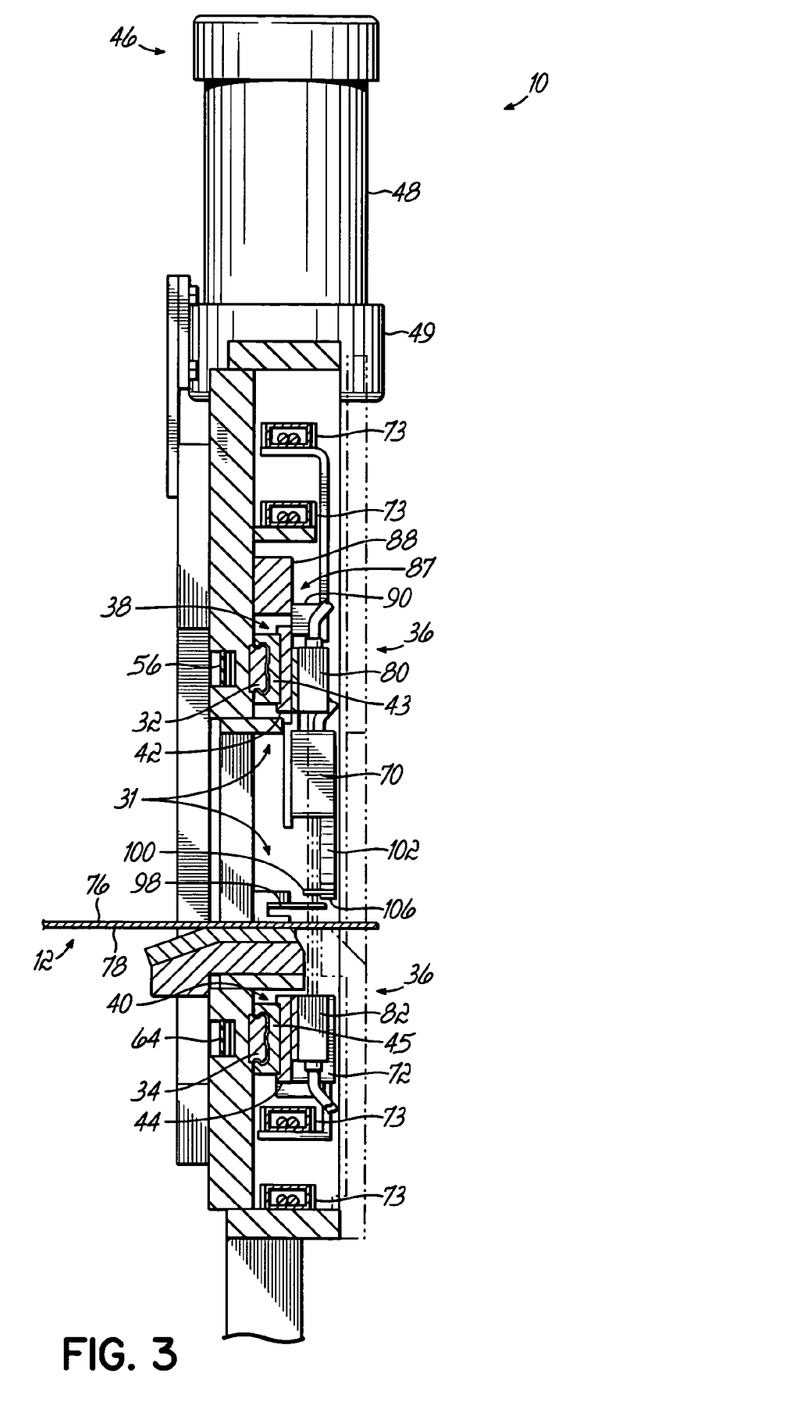
FIG. 3 is a cross-sectional view taken along line 3-3 in FIG. 2.

System 10 further includes a transport device, indicated generally at 36, that is coupled to the frame 14 and is movable along frame 14 transverse to the strip of material 12. The transport device 36 includes an upper carriage 38 and a lower carriage 40. As best shown in FIG. 3, the upper carriage 38 can include a mount block 42 and a bearing block 43 secured to mount block 42 by conventional means. The bearing block 43 includes a plurality of roller bearings (not shown) that engage the raceway formed in rail 32 so that carriage 38 can move along rail 32 across frame 14 transverse to the strip of material 12. Carriage 38 can also be movably coupled to rail 32 by other conventional means. Similarly, the lower carriage 40 can include a mount block 44 and a bearing block 45 secured to mount block 44 by conventional means. The bearing block 45 includes a plurality of roller bearings (not shown) that engage the raceway formed in rail 34 so that carriage 40 can move along rail 34 across frame 14 transverse to the strip of material 12. Carriage 40 can also be movably coupled to rail 34 by other conventional means. The construction and features of bearing blocks, such as bearing blocks 43 and 45, and the associated raceways, are known in the art. For example, known linear motion systems can be used for rail 32 and the associated bearing block 43 as well as rail 34 and the associated bearing block 45. One suitable linear motion system that can be used is the Model THK HRW27 linear motion system made by THK, Inc.

System 10 can further include a moving device indicated generally at 46, that is coupled to the upper carriage 38 and the lower carriage 40 and is operable for moving carriages 38 and 40 along upper rail 32 and lower rail 34, respectively, transverse to the strip of material 12. The moving device 46, as best shown in FIGS. 2 and 3, includes a motor 48 and a rotatable shaft 50 coupled to motor 48 and can further include a gearbox 49 coupled to motor 48 and rotatable shaft 50. An upper gear 52 and a lower gear 54 are coupled to shaft 50 for rotation with shaft 50. As best shown in FIGS. 2 and 4-6, an upper serrated belt 56 engages upper gear 52 and has a first end 60 secured to the upper carriage 38 at a first location and a second end 62 secured to carriage 38 at a second location that is laterally or horizontally spaced from the first location. Between the first 60 and second 62 ends, the belt 56 loops around the opposite side of frame 14. A lower serrated belt 64 engages lower gear 54 and has a first end 66 secured to the lower carriage 40 at a first location and a second end 68 secured to carriage 40 at a second location that is laterally or horizontally spaced from the first location on carriage 40. Between the first 66 and second 68 ends, the belt 64 loops around the opposite side of frame 14. Belts 56 and 64 are effective for transforming the rotation of gears 52 and 54 into linear movement of the upper carriage 38 and lower carriage 40 along the upper rail 32 and lower rail 34, respectively, and therefore along frame 14 and transverse to the strip of material 12 when the material 12 is positioned within the opening 31 defined by frame 14.

Since the gears 52 and 54 are both coupled to shaft 50 and they have the same diameter and pitch, the moving device 46 moves the upper carriage 38 and lower carriage 40 of the transport device 36 synchronously across frame 14. A first distance-measuring sensor 70 is mounted to the upper carriage 38, for movement therewith across the frame 14, by conventional means such as fasteners (not shown). A second distance-measuring sensor 72 is mounted to the lower carriage 40, for movement therewith across frame 14, by conventional means such as fasteners (not shown). Accordingly, the sensors 70 and 72 move synchronously across frame 14 transverse to the strip of material 12 when it is present within opening 31. Each of the sensors 70 and 72 are electrically coupled to a controller, such as a programmable logic controller 74 (shown in FIG. 7). The sensors 70 and 72 are spaced apart vertically by a known distance, and each of the sensors are energy beam emitting sensors. For example, each of the sensors 70 and 72 can be light emitting lasers. One suitable laser that can be used for sensors 70 and 72 is the Model LK-G87 laser made by the Keyence Corporation with each of the sensors 70 and 72 including a transmitter and a receiver. However, other lasers and energy beam emitting sensors can be used within the scope of the present invention. The remaining discussion herein will be consistent with the use of light-emitting lasers for sensors 70 and 72.

The upper sensor 70 is positioned above and proximate a first, upwardly facing surface 76 of the strip of material 12 when it is present within the opening 31 of frame 14. The lower sensor 72 is positioned below and proximate a second oppositely facing surface 78, that is facing downwardly, of the strip of material 12 when it is present within the opening 31 of frame 14. The upper sensor 70 is operably effective for measuring the distance between the upper sensor 70 and the upper surface 76 of the strip of material 12, as subsequently discussed. Similarly, the lower sensor 72 is effective for measuring the distance between the lower sensor 72 and the surface 78 of the strip of material 12.

In the embodiment shown, another sensor 80 is mounted to the upper carriage 38 of the transport device 36, by conventional means such as fasteners (not shown). Similarly, another sensor 82 is mounted to the lower carriage 40 of the transport device 36, by conventional means such as fasteners (not shown). The sensors 80 and 82 move synchronously along frame 14 transverse to the strip of material 12 when it is present within the opening 31 of frame 14. Each of the sensors 80 and 82 are energy beam emitting sensors and are electrically coupled to the controller 74. The sensors 80 and 82 can be light-emitting lasers. One suitable laser that can be used for sensors 80 and 82 is the Model LVH100 laser made by the Keyence Corporation. However, other lasers and energy beam emitting sensors can be used within the scope of the present invention. The remaining discussion herein will be consistent with the use of light-emitting lasers for sensors 80 and 82. One of the sensors 80 and 82 is a transmitter while the other of the sensors 80 and 82 is a receiver. The sensors 80 and 82 are operably effective for detecting the lateral edges 84 and 86 of the strip of material 12 when it is present within the opening 31 of frame 14, as subsequently discussed. The strip of material 12 can be positioned within the opening 31 of frame 14 so that sensors 80 and 82, as well as sensors 70 and 72, move in a direction across the strip of material 12 that is substantially perpendicular to the edges 84 and 86 of the strip of material 12.

Control cables for sensors 70 and 80 can be routed along the front side of frame 14 through a flexible conduit 73, then through frame 14 to controller 74. Similarly, the control cables for sensors 72 and 82 can be routed along the front side of frame 14 through another conduit 73, then through frame 14 to controller 74.

A linear distance measuring device 87 can be used to measure the horizontal distance from a reference location to any location along frame 14 within the range of the linear distance measuring device 87. In the embodiment shown, the linear distance measuring device 87 is an optical reader. However, other linear distance measuring devices, such as those using transducers, can be used within the scope of the invention. One suitable optical reader that can be used is the Model CX 2445 optical reader made by Fagor. The optical reader 87 is electrically coupled to the controller 74 and includes a linear scale 88 that can be mounted by conventional means such as fasteners (not shown) to either the bottom member 24 or the top member 30 of frame 14 and a reader head 90 coupled to scale 88 and mounted on the corresponding one of the lower 40 and upper 38 carriages. In the illustrative embodiment, the linear scale 88 is mounted on the top member 30 of frame 14 and extends horizontally across frame 14, and the reader head 90 is mounted on the upper carriage 38 of the transport device 36.

In the embodiment shown, linear scale 88 includes an elongate piece of glass having a plurality of horizontally and equally spaced notches formed therein, such as by etching. The reader head 90 includes a light source, such as a light emitting diode (not shown) positioned on one side of the linear scale 88 and a sensor (not shown) positioned on the other side of the linear scale 88. As the reader head 90 traverses along scale 88 across frame 14 the reader head 90 senses the presence of the notches in scale 88 as light is passed laterally through the elongate piece of glass of scale 88 by the light emitting diode of reader head 90 and is received by the sensor of reader head 90. When the reader head 90 senses each notch, an electrical pulse or signal is sent to the controller 74. The controller 74 counts the number of electrical pulses and, given the known spacing between the notches on the piece of glass of scale 88, can calculate the horizontal distance from a reference location to any location along frame 14, within the horizontal range of optical reader 87.

Referring to FIG. 1, a clamp 92 is movably mounted on frame 16 between retracted and extended positions. The frame 16 defines an opening 94 for receiving the strip of material 12 therethrough. During normal operation, the clamp 92 is spaced apart, typically above, the strip of material 12, as it moves through frames 14 and 16. However, when it is desired to measure the width of the strip of material 12, an actuating device 96, which can include one or more hydraulic cylinders, lowers the clamp 92 so that it is in contacting and clamping engagement with the strip of material 12. This is done to prevent the strip of material 12 from moving and to hold it flat during the width measuring process so as to ensure an accurate measurement of the width of the strip of material 12. It is not necessary to have the clamp 92 lowered into contacting and clamping engagement with the strip of material 12 during the process of measuring the thickness of the strip of material 12, although this is permissible. Since frame 14 is mechanically isolated from frame 16, the actuation of clamp 92 does not cause frame 14 to deflect and accordingly, actuation of clamp 92 does not adversely affect the distances measured by sensors 70 and 72. The actuating device 96 is electrically coupled to controller 74 and can include one or more hydraulic actuators, or other conventional actuators.

Figure 5:
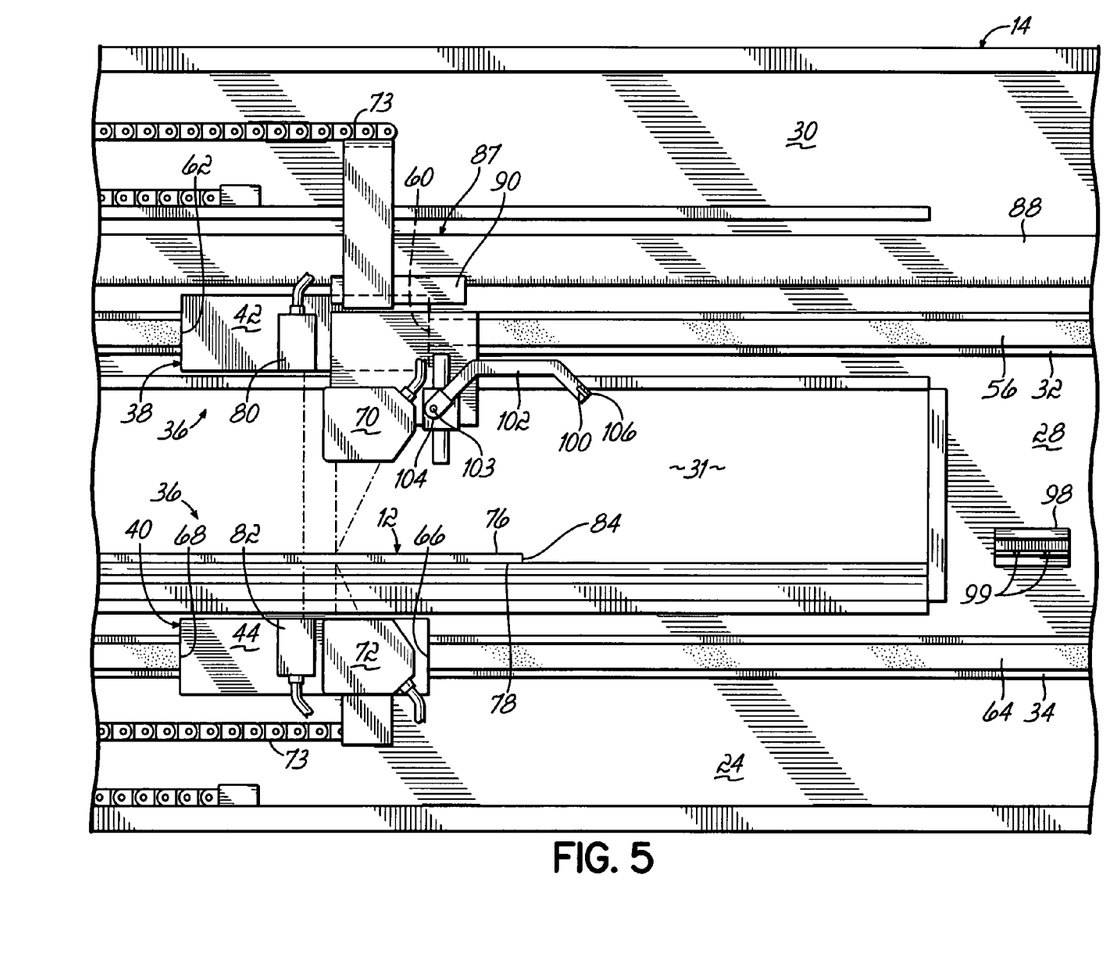
FIG. 5 is a view similar to FIG. 4, but with another two of the included sensors of the system in a position to measure the thickness of the strip of material.
Figure 6:
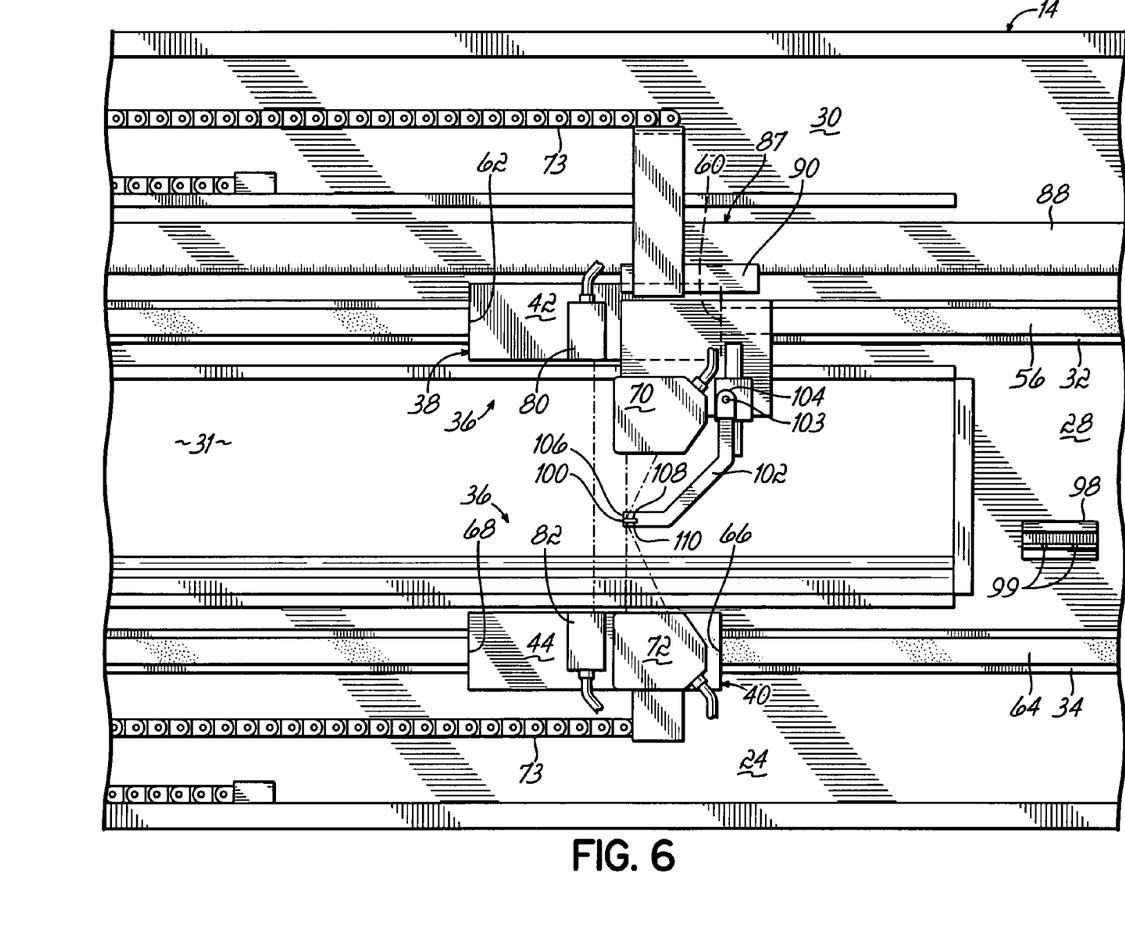
FIG. 6 is a view similar to FIG. 4, but with a translatable gauge block positioned between two of the sensors and the strip of material removed from the frame opening.
Figure 7:
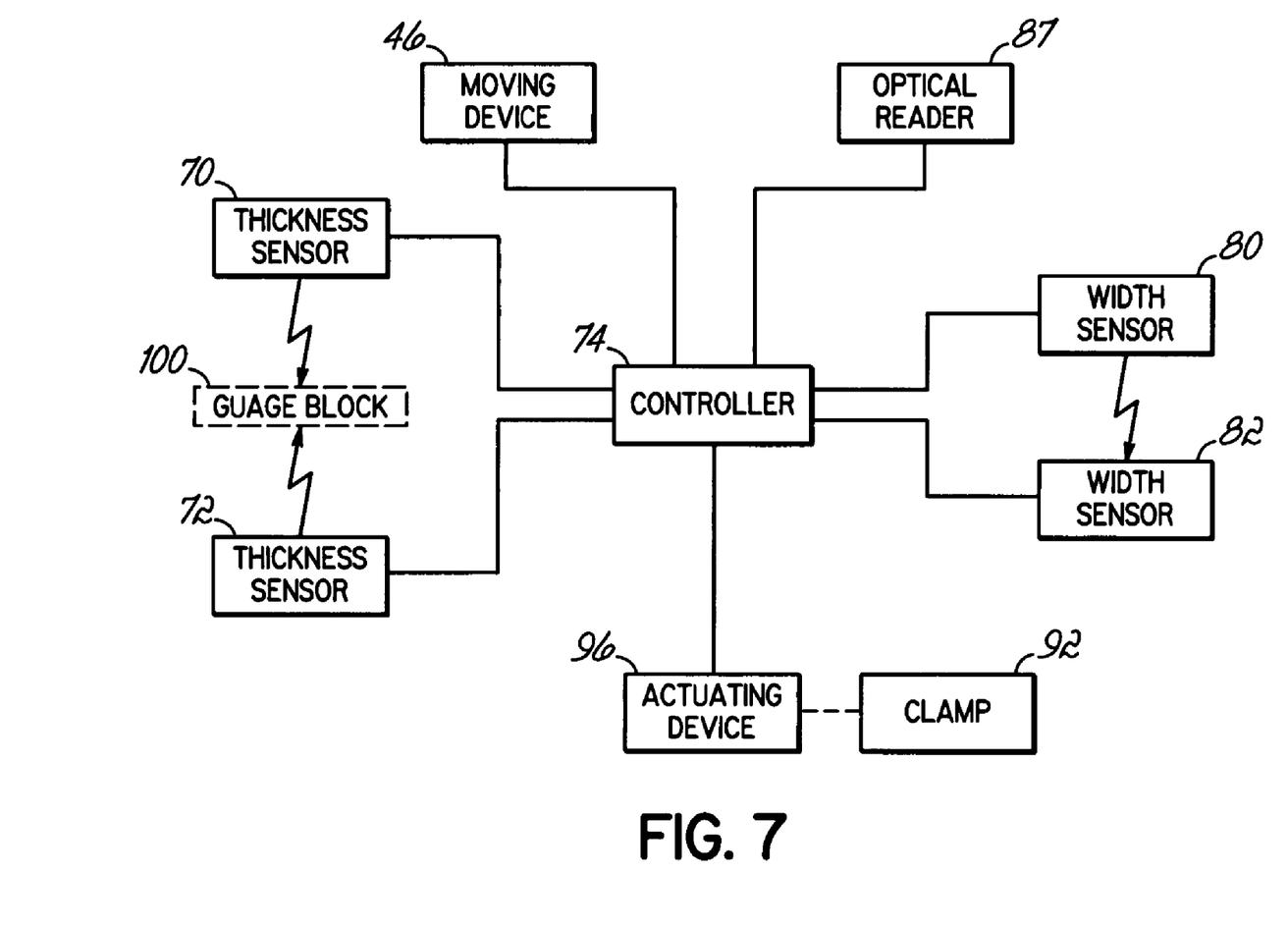
FIG. 7 is a schematic representation of the operation of the system shown in FIGS. 1-6.

The operation of system 10 can be illustrated further with reference to FIG. 7 in addition to FIGS. 1-6. When it is desired to measure the thickness and width of the strip of material 12, the movement of the strip of material 12 is stopped and it is present within the opening 31 of frame 14 and the opening 94 of frame 16. The thickness and width measurements are made automatically by controller 74 as a result of the electrical coupling of controller 74 with various components of system 10 as discussed previously. When the thickness and/or width measurements are desired, the operator of system 10 signals controller 74 to initiate the measurement process.

If width measurements are desired, controller 74 signals the actuating device 96 to lower clamp 92 to the extended position where it is in contacting engagement with the strip of material 12 so that a clamping force is exerted on the strip of material 12, thereby preventing it from moving. The controller 74 then signals the motor 48 of moving device 46 to start so that the upper 38 and lower 40 carriages are moved across frame 14 transverse to the strip of material 12. The controller 74 activates the sensors 80 and 82 so that a light beam is transmitted from one of the sensors 80 and 82 and is received by the other of the sensors 80 and 82 when the sensors 80 and 82 are horizontally spaced from the strip of material 12. However, when the light beam is interrupted by one of the edges 84, 86 of the strip of material 12, a signal is sent to controller 74, which in turn determines the horizontal distance from a reference location to the edge 84 or 86 based on the output of the optical reader 87. The reference or "home" location can be any structure located at a known horizontal location along frame 14. In one embodiment, a limit switch (not shown) is mounted on one of the side members 26 and 28 of the frame 14, with the location of the switch being the reference location. When one of the carriages 38 and 40 contacts the limit switch, the output of linear scale 88 is set to zero. After the second one of the edges 84 and 86 is detected and the horizontal distance from the reference location to this edge has been measured, the distance to the edge 84 or 86 that is closest to the reference location is subtracted from the distance from the reference location to the edge 84 and 86 that is the farthest away from the reference location, thereby determining the width of the strip of material 12.

When it is desired to measure the thickness of the strip of material 12, typically at a plurality of horizontally spaced locations across its width, the controller moves the carriages 38 and 40 to the desired horizontal location and activates sensors 70 and 72. The upper sensor 70 transmits a beam of light to the upper surface 76 of the strip of material 12. The light is reflected off of the surface 76 back to a receiver (not shown) of the sensor 70, with the "time of flight" of the light beam measured and transmitted to controller 74. Given the known speed of light, the distance between sensor 70 and surface 76 is calculated. The controller 74 determines the horizontal distance from the reference location to the location where the thickness is being measured based on the output of linear scale 88. The distance between the lower sensor 72 and the lower surface 78 is measured in the same way, with a light beam, or other energy beam, being transmitted from sensor 72 to surface 78 and reflected back to a receiver (not shown) of sensor 72. Sensors 70 and 72 are spaced apart vertically on frame 14 by a known distance. The thickness of the strip of material 12 is calculated by summing the distance from sensor 70 to surface 76 with the distance from sensor 72 to surface 78, and then subtracting the resultant sum from the known distance between sensors 70 and 72. This process is repeated at a plurality of horizontal locations across the width of the strip of material 12. The horizontal locations can include locations proximate each of the edges 84 and 86 of the strip of material 12 and a location approximately half way between edges 84 and 86. However, the thickness can be measured at any combination of horizontal locations across the width of the strip of material 12.

The width of the strip of material 12 can be determined as the carriages 38 and 40 move in a first direction across frame 14, with the thickness of the strip of material 12 being measured at a plurality of horizontal locations as the carriages 38 and 40 move in the same or opposite direction across frame 14, i.e., during the same excursion of carriages 38 and 40 across frame 14 or during the return excursion across frame 14. A stationary gauge plate 98 is fixedly secured to side member 28 of frame 14 and is positioned proximate opening 31. Each time the carriages 38 and 40 move across frame 14 toward side member 26, the sensors 70 and 72, as well as the sensors 80 and 82, traverse across gauge plate 98. Gauge plate 98 has a known thickness and a known width between opposite lateral edges. Plate 98 can also have one or more slots 99 formed therein. Accordingly, by measuring the thickness of the gauge plate 98 using sensors 70 and 72, and comparing the measured thickness to the known thickness of plate 98, a calibration of sensors 70 and 72 can be achieved. Similarly, by comparing the width of plate 98 measured by sensors 80 and 82 to the known width of plate 98, or by comparing the measured distance between one of the edges of plate 98 and one of the optionally included slots 99 in plate 98, to the corresponding known distance, sensors 80 and 82 can be calibrated. These calibrations of sensors 70, 72, 80 and 82 can be completed for each measurement cycle. A second gauge plate 98 (not shown) can be included and fixedly secured to side member 26 of frame 14.

While the foregoing periodic calibration of sensors 80 and 82, in conjunction with one or more plates 98, is sufficient to ensure an accurate measurement of the width of the strip of material 12, calibration of sensors 70 and 72 using one or stationary plates 98, is not sufficient to ensure an accurate measurement of the thickness of the strip of material 12, across its width, for the following reasons. As may be appreciated by one skilled in the art, the top member 30 and bottom member 24 of frame 14 can deflect relative to one another, by varying amounts across frame 14. These relative deflections can be caused by static loads acting on members 24, 30 and thermal expansion or contraction of members 24, 30. This relative deflection of members 24, 30 can be several thousandths of an inch, for example about seven thousandths of an inch. When the required accuracy of thickness measurement is a few ten thousandths of an inch, it can be appreciated that the relative deflection of members 24 and 30 prevent the measurement of the thickness of the strip of material 12 within the required accuracy. The calibration of sensors 70 and 72 using the stationary gauge plate or plates 98, positioned at one or both sides of the opening 31 of frame 14, does not provide a correction for the thickness measurements made across the width of frame 14 for the relative deflection of members 24, 30 of frame 14.

However, system 10 does correct for the relative deflection of members 24, 30 so that the thickness of the strip of material 12 is made within the required accuracy across the width of the strip of material 12. In the illustrative embodiment, the measured values of the thickness of the strip of material 12 are corrected with a deflection profile created by using a gauge block 100 that is coupled to the transport device 36 for movement with sensors 70 and 72 across frame 14. In the illustrative embodiment, the gauge block 100 is coupled to the upper carriage 38 of the transport device 36, but gauge block 100 can also be coupled to the lower carriage 40.

Figure 4:
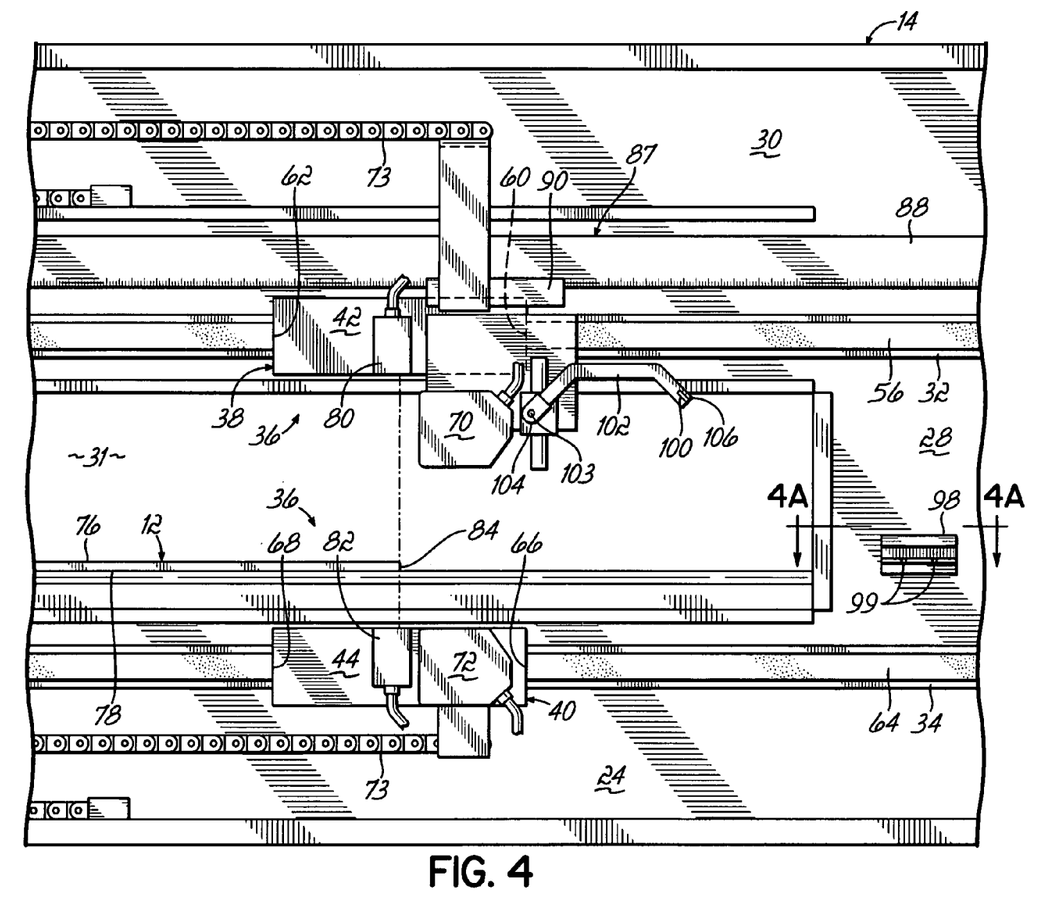
FIG. 4 is a fragmentary front elevation view of the system shown in FIGS. 1-3 illustrating two of the included sensors of the system positioned to detect a lateral edge of a strip of material positioned within a frame opening of the system.
Figure 4A:
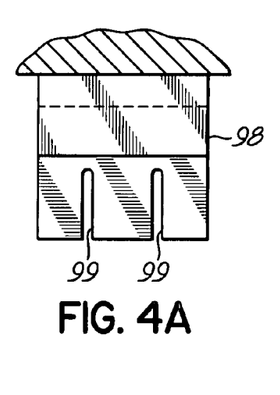
FIG. 4A is a cross-sectional view taken along line 4A-4A in FIG. 4.

In the illustrative embodiment, an arm 102 is pivotally coupled to the upper carriage 38 by conventional means such as a pin 103 passing through a proximal end 104 of arm 102 into carriage 38. The gauge block 100 is secured to, or clamped between, a distal end 106 of arm 102. When the arm 102 is pivoted upwardly (as shown in FIGS. 4 and 5), such that the gauge block 100 is in a stowed position, gauge block 100 is not between sensors 70 and 72. When the arm 102 is pivoted downwardly (as shown in FIG. 6), the gauge block 100 is in a measuring position between sensors 70 and 72. The gauge block 100 has a known thickness, as determined by the National Institute of Standards, extending between a first surface 108, which is an upper surface when block 100 is in the measuring position, and a second surface 110, which is a lower surface when gauge block 100 is in the measuring position.

Figure 8:
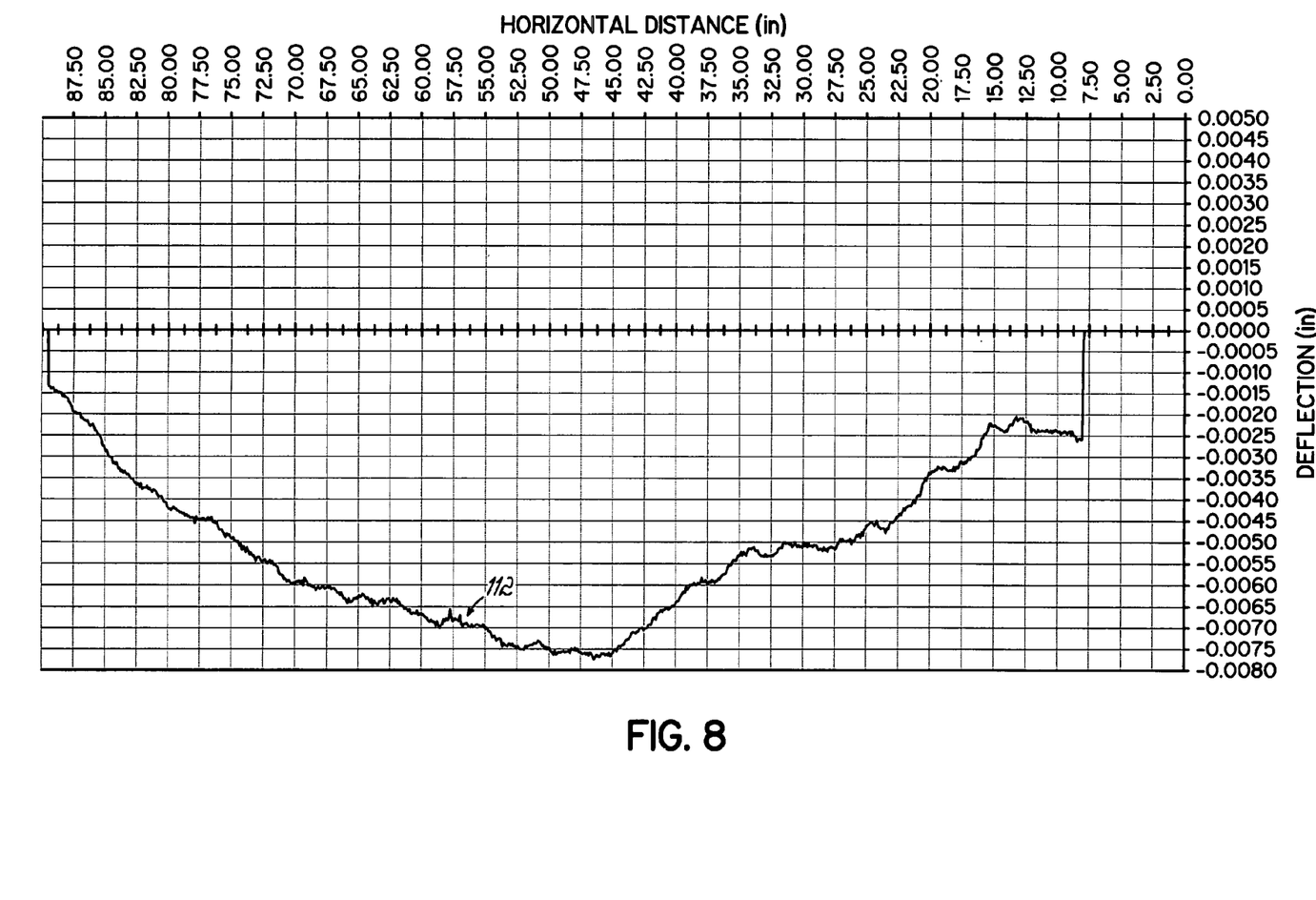
FIG. 8 is a graph of a deflection profile that can be developed using the system shown in FIGS. 1-7.

A deflection profile 112, shown in FIG. 8, is created as follows. The strip of material 12 is removed from the opening 31 of frame 14 to avoid interference with arm 102 as the arm 102 moves across frame 14 between sensors 70 and 72. The controller 74 signals motor 48 to start, causing carriages 38 and 40 to move to a first horizontal location along frame 14. The controller then activates sensors 70 and 72. Accordingly, a light beam is transmitted from sensor 70 to the upper surface 108 of gauge block 100 and is reflected back to sensor 70. Similarly, a light beam is transmitted from sensor 72 to the lower surface 110 of gauge block 100 and is reflected back to sensor 72.

The measured distance from sensor 70 to surface 108 is added to the measured distance from sensor 72 to surface 110 and the resultant sum is subtracted from the known vertical distance from sensor 70 to sensor 72 to give a measured value of the thickness of gauge block 100. The actual thickness of gauge block 100 is then subtracted from the measured thickness of gauge block 100 with the difference being the relative deflection of members 24 and 30 of frame 14. The foregoing calculations are performed by controller 74. The controller 74 also determines the horizontal distance from a reference location to the horizontal location along frame 14 where the thickness of gauge block 100 was measured using the output from scale 88. This distance and the calculated relative deflection between members 24 and 30 produces one point of the deflection profile 112. This process is repeated at a plurality of predetermined horizontal locations along frame 14 so that the deflection profile 112 is developed.

Subsequently, the measured thicknesses of the strip of material 12 can be corrected using the deflection profile 112 to develop a thickness profile of the strip of material 12 across its width, with significantly improved accuracy.

While the foregoing description has set forth one or more embodiments of the present invention in particular detail, it must be understood that numerous modifications, substitutions and changes can be undertaken without departing from the scope of the present invention as defined by the ensuing claims. The invention is therefore not limited to specific embodiments as described, but is only limited as defined by the following claims.

What is claimed is:

1. A system for measuring at least a thickness of a strip of material, with the thickness extending between two oppositely facing surfaces of the strip of material, the strip of material further having a width, said system comprising:
    a frame having an opening for receiving the strip of material;
    a transport device coupled to said frame, said transport device being movable along said frame transverse to the strip of material;
    first and second distance-measuring sensors coupled to said transport device for synchronous movement across said frame transverse to the strip of material, each of said first and second sensors positioned proximate a respective one of the oppositely facing surfaces of the strip of material when the strip is within the opening; and
    a gauge block having two oppositely facing surfaces and a known thickness extending therebetween, said gauge block coupled to said transport device for movement with said first and second sensors across said frame, said gauge block being movable between a measuring position wherein said gauge block is positioned between said first and second sensors and a stowed position wherein said gauge block is positioned out from between said first and second sensors.

2. A system as recited in claim 1, wherein:
    said first and second sensors are energy beam emitting sensors and are operable for measuring the respective distances from said first and second sensors to said oppositely facing surfaces of the strip of material when the strip of material is within the opening and said gauge block is in said stowed position and are operable for measuring the respective distances from said first and second sensors to the oppositely facing surfaces of the gauge block when the strip of material is absent from the opening and said gauge block is in said measuring position.

3. A system as recited in claim 1, further comprising:
    an arm pivotally coupled to said transport device, said gauge block being secured to a distal end of said arm.

4. A system as recited in claim 2, wherein:
    each of said first and second sensors is a light emitting laser.

5. A system as recited in claim 1, further comprising:
    a pair of rails secured to said frame;
    wherein each of said first and second sensors are movable along a respective one of said rails.

6. A system as recited in claim 5, wherein:
    said transport device includes upper and lower carriages, each of said carriages being movable along a respective one of said rails across the width of the strip of material; and
    said first sensor is mounted on one of said upper and lower carriages and said second sensor is mounted on the other of said upper and lower carriages.

7. A system as recited in claim 6, further comprising:
    a moving device coupled to said upper and lower carriages of said transport device and operable for moving said carriages and said first and second sensors synchronously along said rails across the strip of material.

8. A system as recited in claim 7, wherein:
    said moving device comprises a motor, a rotatable shaft coupled to said motor, and upper and lower gears coupled to said shaft for rotation therewith, said moving device further comprising a pair of serrated belts, each of said belts engaging a respective one of said upper and lower gears and secured to a respective one of said upper and lower carriages;
    said belts effective for transforming rotation of said upper and lower gears into linear movement of said upper and lower carriages and said first and second sensors along said rails.

9. A system as recited in claim 1, wherein the width of the strip of material extends between first and second edges, and said system further comprises:
    third and fourth sensors each coupled to a respective one of said upper and lower carriages for movement along said rails across the width of the strip of material;
    said third and fourth sensors effective for detecting the edges of the strip of material.

10. A system as recited in claim 9, further comprising:
    an optical reader effective for measuring a horizontal distance of said first and second sensors from either one of the edges of the strip of material.

11. A system as recited in claim 10, wherein:
    said optical reader includes a linear scale secured to said frame and extending horizontally across said frame, said optical reader further including a reader head coupled to said linear scale.

12. A system as recited in claim 10, further comprising: a controller, wherein:
    said first and second distance-measuring sensors, said third and fourth sensors, said optical reader, and said moving device are electrically coupled to said controller.

13. A system as recited in claim 1, wherein said frame is a first frame, and said system further comprises:
    a second frame spaced from said first frame, said second frame having an opening for receiving the strip of material;
    a clamp movably mounted on said second frame between retracted and extended positions, said clamp exerting a clamp load on the strip of material when the strip of material is within the opening of said second frame and said clamp is in said extended position.

14. A method for measuring at least a thickness of a strip of material, with the thickness extending between two oppositely facing surfaces of the strip of material, said method comprising:
    coupling first and second spaced sensors to a frame for movement along the frame, the frame defining an opening for receiving the strip of material;
    positioning a gauge block between the first and second sensors, the gauge block having two oppositely facing surfaces and a known thickness therebetween;
    moving the sensors and the gauge block along the frame across a width of the opening of the frame without the strip of material present in the opening;
    measuring a first distance between the first sensor and one of the two oppositely facing surfaces of the gauge block and measuring a second distance between the second sensor and the other of the oppositely facing surfaces of the gauge block at each of a plurality of locations along the frame across the width of the opening;

summing the first and second distances at each location and subtracting the sum from a reference value;

creating a deflection profile as a function of distance along the frame;

moving the gauge block out from between the first and second sensors;

inserting the strip of material in the opening;

measuring the thickness of the strip of material with the sensors at each of a plurality of locations along the frame; and correcting the measured values of the thickness of the strip of material with the deflection profile.

15. A method as recited in claim 14, further comprising:

coupling the first and second sensors to upper and lower carriages movable along the frame transverse to the material when the material is present within the opening.

16. A method as recited in claim 15, further comprising:

pivotally coupling an arm to one of the upper and lower carriages and securing the gauge block to a distal end of the arm, wherein the gauge block is pivotable between a stowed position wherein the gauge block is out from between the first and second sensors and a measuring position wherein the gauge block is positioned between the first and second sensors.

17. A method as recited in claim 14, wherein the strip of material further includes a width extending between two edges, said method further comprising:

coupling a third sensor to one of the upper and lower carriages and a fourth sensor to the other of the upper and lower carriages for movement with the upper and lower carriages along the frame;

detecting the respective edges of the strip of material using the third and fourth sensors;

measuring a horizontal distance from a reference location to each of the two edges, thereby determining the width of the strip of material.

18. A method as recited in claim 14, further comprising:

using an optical reader to measure horizontal distances along the frame from a reference location.

* * * * *

UNITED STATES PATENT AND TRADEMARK OFFICE
CERTIFICATE OF CORRECTION

PATENT NO. : 7,310,148 B2  
APPLICATION NO. : 11/355687  
DATED : December 18, 2007  
INVENTOR(S) : Dircksen et al.

It is certified that error appears in the above-identified patent and that said Letters Patent is hereby corrected as shown below:

Col. 9, lines 52-53, "using one or stationary" should read --using one or more stationary--.  
Col. 13, line 3, "a defection profile" should read --a deflection profile--.

Signed and Sealed this

Twenty-eighth Day of October, 2008

JON W. DUDAS  
*Director of the United States Patent and Trademark Office*